Oct. 16, 1956  R. F. WEDGE  2,766,553
PLANT PACKAGE AND METHOD OF MAKING THE SAME
Filed June 20, 1952  2 Sheets-Sheet 1
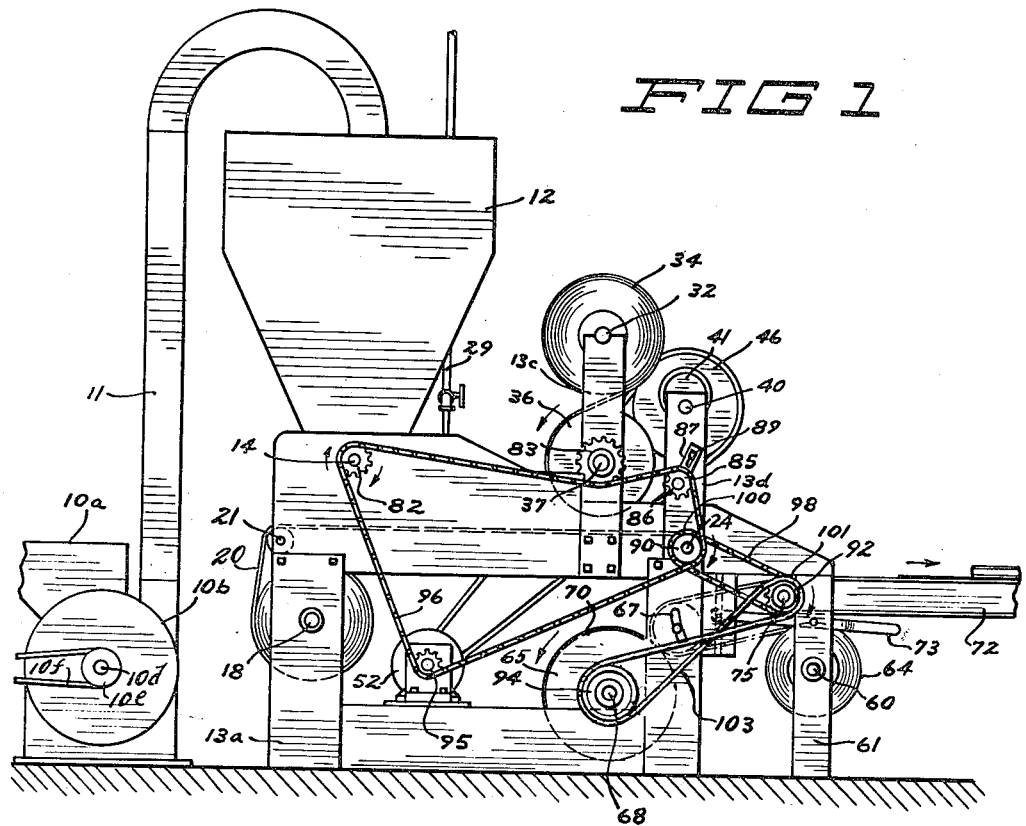
INVENTOR.
RALPH F. WEDGE
BY Chas. E. Reif
ATTORNEY Oct. 16, 1956  R. F. WEDGE  2,766,553
PLANT PACKAGE AND METHOD OF MAKING THE SAME
Filed June 20, 1952  2 Sheets-Sheet 2
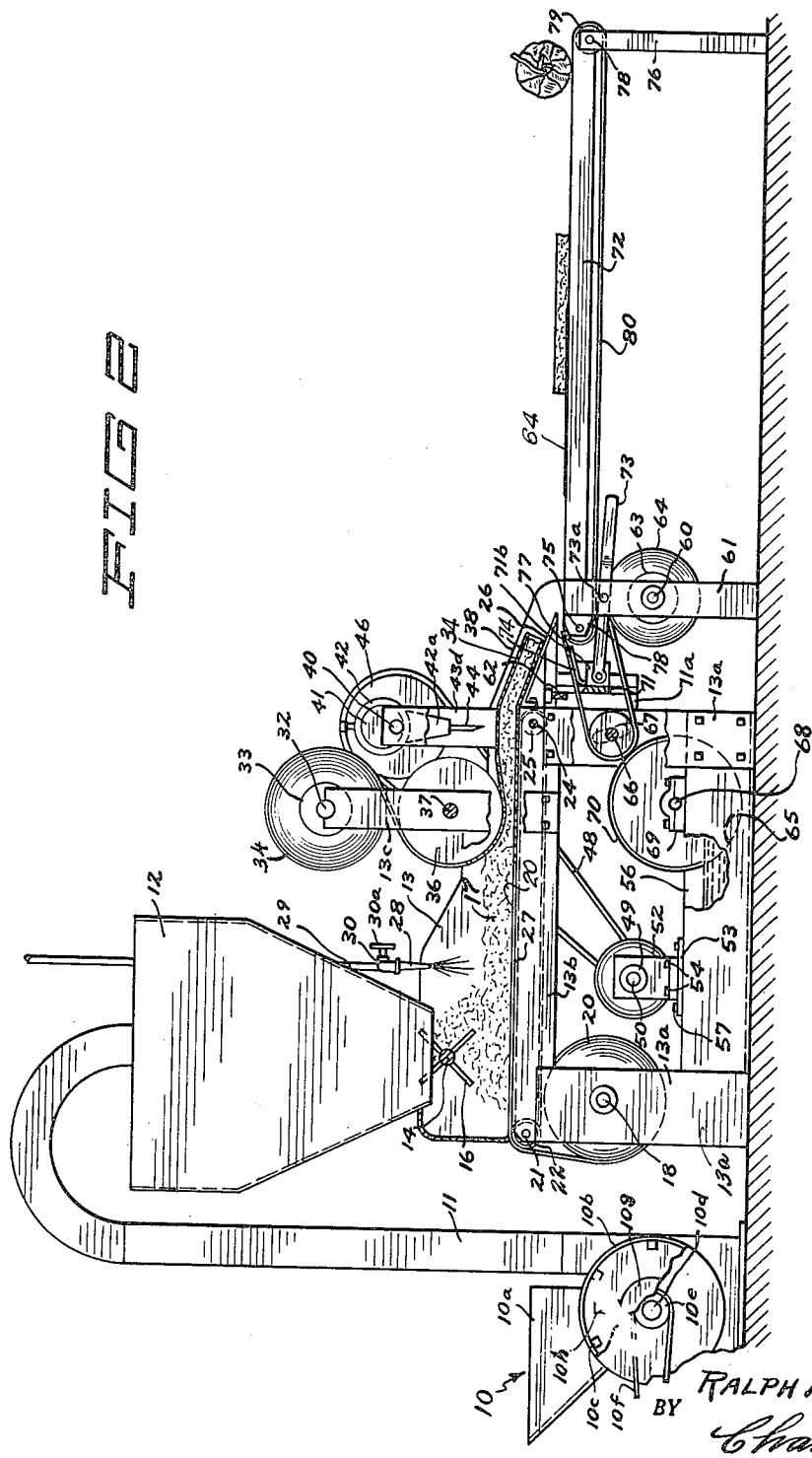
INVENTOR.
RALPH F. WEDGE
BY Chas. C. Reif
ATTORNEY.

United States Patent Office 2,766,553
Patented Oct. 16, 1956

2,766,553

PLANT PACKAGE AND METHOD OF MAKING THE SAME

Ralph F. Wedge, Albert Lea, Minn.

Application June 20, 1952, Serial No. 294,656

15 Claims. (Cl. 47—37)

This invention relates to a plant package and the method of making the same.

It is now the custom to package certain live plants for the market, and while various kinds of plants can be so packaged, one class of plant which is packaged in large numbers is that of roses. The root portion of the plant is disposed in the package, the upper or leaf portion of the plant usually being exposed. It is important to have a certain amount of moisture in the material about the root portion of the plant and the amount of moisture must be carefully determined. If there is too much moisture it will stimulate the budding of the plant prematurely and weaken the plant. If there is too little moisture, the plant will suffer from lack of such moisture.

It is desirable to have a package which is as light in weight as possible to lower transportation costs. It is also desirable to have packages of substantially uniform shape so that they can be packed advantageously in cartons or containers. Many packing materials have been used, including peat, sphagnum moss, excelsior, etc., but all of these materials have been found to have certain objections.

It is an object of this invention to provide a plant package in which the material contacting and disposed about the roots of the plant is paper which has been disintegrated into small particles. While various papers might be used, in practice used newsprint paper has been found to be very suitable.

It is a further object of the invention to provide a plant package comprising a layer of small particles of disintegrated paper disposed between a sheet of strong paper and a sheet of absorbent paper, said layer having a definite amount of liquid added thereto, said sheets and layer forming in effect a unit, which unit is wrapped about the root portion of the plant to form a roll, together with a third sheet wrapped about said roll and sealed at the sides and bottom thereof and disposed against the stem of the plant at the top of the roll to close the top of said roll, said third sheet being preferably waterproof and secured or sealed by an adhesive, such as tar.

It is another object of the invention to provide a novel and efficient method of forming a plant package comprising disintegrating paper, such as newsprint paper, into small particles, placing said particles in a layer on a sheet of strong paper, adding liquid to said layer, placing a sheet of absorbent paper on top of said layer, compressing said layer between said sheets, said layer and sheets being made of definite lengths to form a unit, placing the root portion of a plant on said absorbent sheet and wrapping said unit about said root portion to form a substantially cylindrical roll and wrapping a third sheet, preferably of waterproof paper, about said roll, sealing said third sheet about said roll at the sides and bottom thereof and folding said third sheet over the top of said roll and about the stem of said plant.

It is also an object of this invention to provide a method of making a plant package which consists in disintegrating newsprint paper into small particles, moving a sheet of strong paper, such as kraft paper, placing said particles on said sheet in a layer, adding water to said layer, moving a second sheet of absorbent paper above said layer, compressing said layer between said sheets, cutting said sheets and layer into definite lengths to form units, placing the root portion of a plant on said absorbent sheet, wrapping said unit about said root portion to form a substantially cylindrical roll, and wrapping a third sheet of strong paper, preferably waterproof paper, about said roll and sealing the same about said roll.

It is more specifically an object of this invention to provide a method of making a plant package which consists in disintegrating newsprint paper into small particles, moving a sheet of strong paper, such as kraft paper, placing said particles on said sheet in a layer, adding liquid to said layer, moving a second sheet of absorbent paper above said layer, compressing said layer between said sheets, cutting said sheets and layer into definite lengths to form units, moving a third sheet of strong paper, preferably waterproof paper, coating said third sheet with hot tar, moving said units onto the coated side of said third sheet, placing the root portion of a plant on said absorbent sheet, wrapping said unit and third sheet into a roll and folding said third sheet about the ends of said roll and sealing the same about said roll at the sides and ends thereof.

It is an object of this invention to provide an apparatus for operating on a plant package comprising means for disintegrating paper, such as used newsprint paper, into small particles, a hopper, means for delivering said particles to said hopper, means for moving a sheet of strong paper, such as kraft paper, beneath said hopper, means for feeding particles from said hopper onto said sheet to form a layer, means for adding liquid to said layer, means for moving a sheet of absorbent paper above said layer, means for compressing said layer between said sheets, means for cutting off said sheets and layer into definite lengths to form units, means for moving a third sheet of strong paper, preferably waterproof paper, and means for coating said third sheet with hot tar, said units being moved onto said third sheet.

These and other objects and advantages of the invention will be fully set forth in the following description made in connection with the accompanying drawings in which like reference characters refer to similar parts throughout the several views and in which:

Fig. 1 is a view in side elevation of an apparatus used in making said plant package;

Fig. 2 is a view partly in side elevation and partly in vertical section of said apparatus;

Fig. 3 is a perspective view of a partially finished package;

Fig. 4 is a perspective view of a finished package; and

Fig. 5 is a bottom plan view of a finished package.

Referring to the drawings, an apparatus is shown comprising a hammer mill 10. This hammer mill is of a common type now on the market and comprises a hopper 10a, a grinding or disintegrating chamber 10b shown as of cylindrical form, the same having on its inner wall transversely extending bars 10c. Said mill comprises a driving shaft 10d to which is secured a pulley 10e which will be driven by a suitable belt 10f. Said shaft 10d has secured thereto a hub 10g to which are pivoted groups of hammers 10h in the form of slightly spaced flat bars. Such hammer mills as stated are now common in the art and it is thought no further description thereof will be necessary. The paper, such as newsprint paper, is placed in the hopper 10a and moved down into the grinding casing 10b where it is torn and lacerated and disintegrated into small particles by the action of the groups of blades 10h and the bars 10c. The paper is reduced to very small particles and while the size of these may be varied, in practice it has been found that particles which will pass through a quarter inch mesh screen are very suitable. The particles are discharged from the chamber 10b into a chute or conduit 11 and are delivered into a hopper 12. Hopper 12 is disposed on the frame 13 of a machine, which frame comprises the leg portions 13a arranged at the corners of a rectangle and between which extend longitudinal horizontal members 13b. Hopper 12 has downwardly converging sides and an opening at its bottom and a shaft 14 extends transversely of said opening and carries a measuring means or wheel 16. The particles of disintegrated paper 17 are fed in measured quantity from hopper 12 by said wheel 16. A shaft 18 is journaled in one pair of the legs 13a and carries a drum on which is wound a roll of paper 20 in the form of a sheet. The paper 20 is a strong paper, such as strong kraft paper. A shaft 21 is journaled in frame member 13b and carries a roller 22. Another shaft 24 is journaled in member 13b adjacent the other end thereof and carries a roller 25. An endless belt or conveyor 27 passes around rollers 22 and 25. The sheet of paper from roller 20 passes upwardly onto the top of conveyor belt 27. A downwardly extending plate 26 has one end secured to the ends of member 13b and its front top portion is flush with conveyor belt 27 over which the sheet of paper 20 moves.

A series of spaced spray nozzles 28 are disposed transversely of the machine and are connected to a supply conduit 29 for liquid, such as water. The conduit 29 has secured therein a valve 30 for regulating the amount of water delivered through nozzles 28. Valve 30 has an operating handwheel 30a.

A shaft 32 is journaled in transversely spaced frame members 13c which upstand from members 13b. Said shaft 32 carries a drum 33 on which is wound a roll of paper 34. The paper from roll 34 passes around and beneath a roller 36 carried on a shaft 37 also journaled in frame membres 13c. Paper 34 will be an absorbent paper and of lighter and preferably softer texture than the paper 20. The layer of material passes beneath roller 36 and the sheet of paper 34 and is compressed by roller 36, as shown in Fig. 2. The disintegrated paper is somewhat resilient and after passing under roller 36 springs upwardly somewhat, as shown in Fig. 2. The sheets of paper and layer of material therebetween then move downwardly over plate 26 and between side plates 38 at the sides thereof.

A shaft 40 is journaled in transversely spaced frame members 13d secured to and upstanding from one end of frame member 13b. Shaft 40 has secured thereto an eccentric 41 surrounded by an eccentric strap 42 in turn secured to an arm 42a from which depends a cutter blade 44. Shaft 40 also has secured thereto a flywheel 46. Flywheel 46 is driven by a belt 48 which runs over a pulley 49 secured to the driving shaft 50 of an electric motor 52 secured to a plate 53 by headed bolts 54. Plate 53 extends across the top of a tank 56 to be later described and is secured thereto by headed bolts 57.

A shaft 60 is journaled in bearings in spaced vertical members 61 extending upwardly from the floor or supporting surface. Shaft 60 has secured thereto a roll 63 on which is wound a sheet of paper 64. A shaft 66 is journaled in bearings in the rear leg members 13a and has secured thereto a roller 67. Means is provided for cutting the sheet of paper 64 at the desired time and this comprises a stationary cutter bar 62 extending transversely above the sheet of paper 64 and a movable cutter bar 71. Cutter bar 71 moves between spaced guiding members 71a. While cutter bar 71 could be variously moved, in the embodiment of the invention illustrated said bar has secured thereto at one side of said guide 71a a plate 71b. A plate 74 carried on a plate 71b is disposed beneath sheet 64 and supports and guides the same. A lever 73 is pivoted at one end to plate 71b and at its other end is pivoted by a pivot 73a to one of the legs 61. The pivot connecting lever 73 to plate 71b will be arranged for some movement to compensate for the arc of movement thereof. A shaft 68 is journaled in bearings 69 supported on the top of tank 56 and carries a roller 65. Said roller 65 has on its periphery a layer of yielding material 70, such as felt or soft absorbent fabric. A horizontal member 72 extends between the top portion of leg members 61 and the transversely spaced leg members 76. Member 72 has a flat top surface extending between the spaced pairs of legs 61 and 76. A roller 77 is carried on a shaft 75 journaled in brackets 78 secured to one side of the leg 61. A shaft 78 is journaled in the upper ends of leg 76 and carries a roller 79. An endless conveyor belt 80 passes around rollers 77 and 79 and is disposed a short distance below the lower end of plate 26. The sheet of paper 64 from roller 63 passes around the roller 67 and up onto the top of conveyor belt 80. Said sheet moves in contact with the layer 70 on roller 65.

Shaft 14 has secured to one end thereof a sprocket 82 and shaft 37 has secured to one end thereof a sprocket 83. A sprocket 85 is carried on a stud 86 secured in a bracket 87 secured to one of the uprights 13d. Bracket 87 is secured by a headed bolt 89 extending through a slot in bracket 87 so that the position of bracket 87 can be varied. Shaft 24 has a sprocket 90 secured to one end thereof and shaft 75 has a pulley 92 secured thereto, while shaft 68 has a pulley 94 secured thereto. Motor shaft 50 has a sprocket 95 secured to the other end thereof. A chain 96 runs over sprocket 82 and under sprocket 83, then somewhat upwardly over sprocket 85, then downwardly and around sprocket 90 and downwardly and around sprocket 95. Chain 96 will be driven by sprocket 95 on the shaft of motor 52 so that shaft 14 will be driven, thus driving the feeding wheel 16. Shaft 37 will be driven, thus driving the roller 36. Sprocket 85 is provided to direct the chain so that it effectively engages sprocket 83. Sprocket 90 will be driven thus rotating shaft 24, and roller 25, thus driving conveyor 27. A chain 98 runs over a second sprocket 100 on shaft 24 and runs over a second sprocket 101 on shaft 75. Shaft 75 is thus driven and rotates roller 77 which drives conveyor 80. A crossed belt 103 runs over pulley 92 and also over pulley 94 thus driving shaft 68 and roller 65.

In operating the apparatus and in carrying out the method, belt 10f will be driven from suitable source of power and the hammer mill 10 will be operated. The paper, such as print paper, will be placed in the hopper 10a and will move down into the chamber of casing 10b where it will be torn and shredded into the desired size of particles. The casing 10b can be formed as a screen in its lower portion and when the particles are brought to the desired size they will be passed through said screen. Said particles will then be forced upwardly through conduit 11 and into the hopper 12. By disintegrating the paper to form said particles it is so torn and shredded that it is of a fluffy texture. The particles of the paper are then fed from hopper 12 in accurate amounts by the feeding wheel 16 and deposited in a uniform layer on the sheet of paper 20. Liquid, such as water, is sprayed onto the layer by the nozzles 28. This amount of water can be nicely regulated and it is important that the proper amount be deposited on the layer of particles so that they are properly moistened. Said sheet of paper 20 carries the layer rearwardly and the same passes under roller 36 where it is compressed, as shown in Fig. 2. The sheet of paper 34 is brought onto the top of the layer of particles by the roller 36 and this sheet of paper 34 then moves along with and on top of the layer of particles. The body or layer of particles is somewhat resilient and after passing beneath roller 36 it springs back to a somewhat greater depth. The shaft 42 is driven by the rotation of flywheel 46 and the eccentric 41 raises and lowers the cutter 44 at the desired intervals so that the layer of particles with the sheets of paper 20 and 34 at the bottom and top respectively is severed into the desired lengths. The layer of the particles with the paper at the top and bottom thereof thus forms in effect a unit or member. The sheet of paper 64 is moved by its engagement with the covering 70 on roller 65. Roller 65 moves through the body of hot tar or other adhesive contained in tank 56 and this is applied to the surface of the sheet of paper 64 as it engages covering 70 on roller 65. Roller 67 is rotated by the friction of covering 70 and the sheet of paper 64 so that the latter is moved along on top of conveyor 80 and beneath the plate 26. The unit comprising the layer of particles and sheets of paper at the top and bottom thereof is preferably deposited on the sheet 64 so that a considerable portion thereof does not contact said sheet 64, as shown in Fig. 2. The operator will manipulate the sheets to accomplish this. Sheet 64 is of greater width than sheets 20 and 34. Sheet 64 is preferably moved at a higher speed than sheets 20 and 34. An operator stands at the rear portion of conveyor 80 and he takes the plant 105, such as a rosebush, and places the root portion thereof on top of said unit and thus on the top of the sheet of paper 34. He then rolls said unit about said root portion and then wraps the additional portion of sheet 64 at the end of said unit about the roll formed so that the sheet 64 is sealed about the said roll. When the root portion is rolled into said unit a substantial cylindrical roll is formed. The paper 64, as stated, will be coated with a good adhesive, and in practice hot tar has been used. When the tar-coated sheet 64 is wrapped around said roll, said sheet can be very effectively sealed along one side of said roll. The sheet 64 is then folded inwardly across the bottom of the rolled unit and due to the hot tar thereon a tight seal can be had by the overlapping portions 64b of sheet 64 at the bottom of said unit. The sheet 64 is then folded inwardly at the top of said unit to and about the stem or stalk of the plant and an effective seal can thus be had at the top of said unit by overlapping portions 64b. A package 106 is thus formed in which the root portion and part of the stem or stalk of the plant is enclosed and this package is sealed so that no moisture can escape. The paper 64 coated with the hot tar is preferably waterproof. In some cases it might be advisable to use an asphalted or other waterproof paper as the bottom layer of said unit or for the paper sheet 20 and let this sheet become the outside covering for the final package. The sealing is very important (1) To prevent moisture from breaking down the paper in which the plant is wrapped;
(2) To prevent damage to shipping containers;
(3) To prevent smearing of any printing matter including pictures which may be on the outside paper wrapping;
(4) To prevent damage to other articles which may come in contact with the package.

It is also obvious that two or more plants could be wrapped in one package.

From the above description it will be seen that I have provided a very efficient package for a growing plant. As stated, in the nursery field various substances or materials have been used in plant packages including sphagnum moss, shingle tow, shavings or other wood by-products, chopped straw and peat moss. All of these materials have some objection. By using the paper particles formed by used newsprint a very cheap product is obtained. The moisture passes readily through the sheet 34 and thus keeps the roots of the plant moist. Sheet 34 can be thin tissue paper. Trouble has been experienced in plant packages in getting the desired amount of moisture. With the present process the moisture can be determined so that substantially the correct amount is provided. Since moisture is one of the greatest factors controlling the dormancy of the plant and is a very important factor in maintaining the vitality of the plant during storage, transportation and display for sale, it will be seen that the amount of moisture is very important. The rate of plant growth may be accelerated by a high moisture content and in like manner retarded by a low moisture content. With the present material a practically absolute predetermination is possible. It is thus not necessary to add an excess of moisture as a safety factor. With the present package the plant can be kept in excellent condition for a long period.

The cost of new paper for a package would entail considerable expense. While paper sheets have sometimes been used for plant packages, it was impossible to get uniformity of paper or moisture. By disintegrating the paper into small particles it not only is made quite adsorbent but a uniform product is produced. The disintegrated particles are easily handled to get a uniform layer, and, as stated, by tearing the paper into such particles its absorptive capacity is greatly increased and the rate of absorption is increased. Such paper can hold up to six times its own weight in water. The fluffing up of the paper greatly increases its bulk. In practice, the bulk has been increased about tenfold. This produces a very light material and the weight of the material per package is quite small. This means a lower transportation cost. The fibrous structure of the particles makes them cling together so that in the package the uniform structure is maintained and there is no settling to the bottom of the package as has been the case with some other materials. The small paper particles also conform readily to the shape of the roots and can be brought into very intimate contact therewith. The disintegrated paper also has a high insulation quality and this acts against quick temperature changes for the package. It should be noted that no adhesive is used in the said unit so that the paper particles are not connected to each other nor to the upper and lower sheets of the unit. While there is a tendency for the particles to cling to each other due to the wetting thereof, the particles can readily move relatively to each other and to said sheets.

The disintegrated paper can also be fed and distributed in very accurate amounts. Substantially the same amount can thus be placed in each package. Uniform packages can thus be produced and they will thus fit in cartons in uniform numbers. Some plant packages heretofore produced have varied greatly in size and it has been very difficult to get them into the shipping containers. In the present package the material is perfectly distributed about the plant and a very symmetrical package is produced. Fertilizers, colored material or perfumes can be readily mixed with the material if desired. By varying the length of said unit the diameter of the package can be made to suit the various sizes and different kinds of plants packaged.

The plant is wrapped right after the moisture is added and before the moisture has weakened the dry strength of the top paper on the unit.

The method and package have been amply demonstrated in actual practice and found to be very successful and efficient in producing a plant package of great merit.

It will of course be understood that various changes may be made in the form, details and arrangements of the elements of the package and in the steps and sequence of steps of the method without departing from the scope of applicant's invention, which, generally stated, consists in a method and product capable of carrying out the objects above set forth, such as disclosed and defined in the appended claims.

What is claimed is:

1. The method of making a package for a plant which consists in disintegrating newsprint paper into small particles, feeding said particles in a layer onto a moving sheet of strong paper, adding liquid to said layer to furnish moisture for said plant, feeding a second sheet of light absorbent paper above said layer and moving it in the same direction as said first mentioned sheet and layer, compressing said layer between said sheets of paper, cutting said sheets and layers into definite lengths to form a unit, wrapping said unit about the root portion of a plant with said second sheet adjacent said root portion to form a roll, folding a waterproof wrapper around said roll and sealing the same about said plant to form a waterproof yielding and somewhat resilient package for protecting and supplying moisture to said plant.

2. The method of making a package containing a plant which consists in disintegrating newsprint paper into small particles, feeding said particles onto a moving sheet of strong paper in a layer, adding liquid to said layer to provide moisture for said plant, feeding a second sheet of absorbent paper above said layer and moving it in the same direction as said first mentioned sheet and layer, compressing said layer between said sheets of paper, cutting said sheets and layer into definite lengths, moving a third sheet of strong paper, coating said third sheet with hot tar, moving said cut sheets and layer therebetween onto said third sheet, wrapping said cut sheets and layer therebetween about the root portion of a plant to form a substantially cylindrical roll and sealing said roll by wrapping said third sheet thereabout to close the bottom of said roll and disposing said third sheet across the top of said roll and about the stem of said plant.

3. The method of making a package containing a plant comprising disintegrating paper into small particles, placing said particles in a layer on a sheet of strong paper, adding water to said layer, placing a sheet of absorbent paper on top of said layer, said sheets being made of definite lengths, placing the root portion of said plant on said absorbent sheet so as to have moisture contacting said root portion, wrapping said sheets and layer therebetween about said root portion to form a unit and wrapping a third sheet about said unit and sealing said third sheet at the side, top and bottom of said rolled unit.

4. The method of making a package containing a live plant which consists in disintegrating absorbent paper into fine particles, distributing said particles in a layer on a sheet of strong paper in loose condition, adding liquid to said layer to provide moisture for said plant, placing a sheet of absorbent material on top of said layer so that said latter sheet will absorb moisture, placing the root portion of said plant on said absorbent sheet and wrapping said layer and sheets about the root portion of said plant with said second sheet adjacent to said portion to form a roll, providing said roll with a waterproof covering and sealing said roll at its side and ends.

5. The method of making a plant package which consists in disintegrating sheets of absorbent paper into fine particles, distributing said particles in a layer on a sheet of waterproof paper, adding liquid to said layer to provide moisture for said plant, placing a sheet of absorbent material on top of said layer so as to absorb moisture from said layer, placing the root portion of a live plant on said latter layer whereby moisture is adjacent said portion, wrapping said sheets and layer about said root portion to form a roll and sealing said waterproof sheet about said roll.

6. The method of making a plant package which consists in disintegrating sheets of absorbent paper into fine particles, providing a sheet of strong paper, distributing a layer of said particles in loose condition on said sheet, adding water to said layer to provide moisture for said plant, placing a sheet of lighter absorbent paper on top of said layer and wrapping said sheets and layer about the root portion of a live plant with said absorbent layer adjacent the roots of said plant so that moisture will be transferred to said roots, said particles being free to move relatively to each other and to said sheets.

7. A plant package comprising particles of disintegrated paper compressed in a layer, said layer containing liquid for the plant contained within the package, a strong sheet of paper at one side of said layer, an absorbent sheet of paper at the other side of said layer and positioned to engage the root portion of the plant, said sheets of paper and layer being positioned to surround said root portion in the form of a roll, and a third sheet of strong paper wrapped around the sides of said roll and folded about the ends thereof, said third sheet of paper being sealed about said roll.

8. A plant package having a pair of layer of paper having therebetween a quantity of small absorbent particles of paper positioned to surround the root portion of a plant contained within said package, a certain amount of water mixed with said particles and a member disposed about and sealing said root portion, liquid and particles, said particles being free to move relatively to each other.

9. The structure set forth in claim 7, said particles constituting disintegrated parts of used newsprint paper.

10. A plant package having a layer of small particles of absorbent paper positioned to surround the root portion of the plant contained within said package, said layer having a sheet of absorbent paper at the side thereof positioned to engage said root portion, a quantity of liquid mixed with said particles and a waterproof member of sheet material enclosing and sealing said root portion, particles and liquid.

11. A plant package having a member comprising a layer of small particles of absorbent paper positioned to surround the root portion of a plant contained within said package, a sheet of strong paper at one side of said layer and a sheet of absorbent paper at the other side of said layer, a quantity of liquid in said particles whereby said latter sheet has liquid absorbed therein, said absorbent sheet positioned to engage said root portion, said particles being free to move relatively to each other and to said sheets, and a sheet of water-proof paper wrapped about said member and plant and forming a seal about said member and root portion.

12. A plant package comprising a layer of particles formed from absorbent sheet material having a sheet of absorbent material at one side thereof, said sheet and layer being positioned to be wrapped about the root portion of a plant contained within said package in the form of a roll with said absorbent sheet engaging said root portion, a quantity of liquid in said particles and a waterproof sheet wrapped about said roll and sealing the same at the side and ends thereof, said particles being free to move relatively to each other and to said sheet.

13. A plant package comprising a quantity of particles of absorbent material disposed between top and bottom layers of paper and positioned to surround the root portion of a plant contained within said package, one of said layers being absorbent and engaging said root portion and a sheet of waterproof material wrapped about said roll and sealing the same.

14. A plant package comprising a body of small particles of used newsprint paper adapted to be disposed about the root portion of a plant contained within said package in the form of a roll, a quantity of water in said body and a sheet of waterproof material wrapped about said roll and sealing the same at the side and ends.

15. A plant package comprising a layer of small particles of absorbent material, a sheet of strong kraft paper at the bottom of said layer, a sheet of absorbent paper at the top of said layer, said layer being disposed about the root portion of a plant contained within said package and forming a roll and a sheet of material wrapped about said roll and sealing the same at its side and ends.

References Cited in the file of this patent

UNITED STATES PATENTS

| | | |
|---|---|---|
| 1,336,402 | Weiss | Apr. 6, 1920 |
| 1,726,573 | Lang | Sept. 3, 1929 |
| 1,837,261 | Gerard | Dec. 22, 1931 |
| 1,874,659 | Upson | Aug. 30, 1932 |
| 1,988,691 | Lovett | Jan. 22, 1935 |
| 2,097,929 | Lovett | Nov. 2, 1937 |
| 2,200,171 | Hermanson | May 7, 1940 |
| 2,368,140 | Johnson | Jan. 30, 1945 |